United States Patent

Henry

[15] 3,640,365
[45] Feb. 8, 1972

[54] MULTIPLE SEGMENT CENTRIFUGAL CLUTCH

[72] Inventor: Charles Frederick Henry, Carson, Calif.

[73] Assignee: McCulloch Corporation, Los Angeles, Calif.

[22] Filed: Oct. 30, 1970

[21] Appl. No.: 85,345

[52] U.S. Cl. .....................................................192/105 BA
[51] Int. Cl. ...........................................................F16d 43/24
[58] Field of Search ..................192/104 B, 105 BA, 105 BB,
192/105 CE, 105 CF, 75, 76, 41 A, 45.1

[56] References Cited

UNITED STATES PATENTS

| | | | |
|---|---|---|---|
| 2,806,566 | 9/1957 | Szady et al. | 192/45.1 |
| 2,947,399 | 8/1960 | Moore et al. | 192/105 BA |
| 3,477,555 | 11/1969 | Hazzard | 192/105 BA |

Primary Examiner—Allan D. Hermann
Attorney—Burns, Doane, Swecker & Mathis

[57] ABSTRACT

A centrifugal clutch having a driven assembly and a driving assembly including articulated clutch shoe assemblies that are spring biased radially inwardly into a nonclutching position by a coiled garter spring. Each clutch shoe assembly comprises a plurality of independent, generally radially extending segments which are operable to overcome the bias of the spring and to individually engage an inner cylindrical surface of a drum comprising a portion of the driven assembly. The segments are assembled for limited relative movement relative to one another and each segment includes an end surface for substantially conformingly engaging the drum surface. Radial and tangential force components are transmitted through each of the clutch shoe segments, to the driven assembly by driving fingers when the segments move outwardly against the spring bias in response to centrifugal force. By reason of the drum surface conforming nature of the end surfaces of each clutch shoe segment and the provision for relative movement therebetween, each clutch shoe assembly may engage the clutching surface of the driven assembly over substantially the entire clutching surface of the shoe as the individual clutch shoe segments independently move outwardly to engage the mating clutching surface of the drum.

14 Claims, 3 Drawing Figures

PATENTED FEB 8 1972

3,640,365

INVENTOR
CHARLES FREDERICK HENRY

BY Burns, Doane, Swecker & Mathis

ATTORNEYS

MULTIPLE SEGMENT CENTRIFUGAL CLUTCH

BACKGROUND OF THE INVENTION

This invention relates to centrifugal clutches. More particularly, this invention relates to a centrifugal clutch construction with articulates shoe assemblies.

A variety of centrifugal clutches have been developed in an effort to promote reliability in clutching operations while maintaining economy of manufacture and installation. Although such clutches may often be adequate they may sometimes be undesirable for a number of reasons.

For example, one type of centrifugal clutch found in the prior art is that disclosed in U.S. Pat. No. 2,688,390 wherein a pair of pivoted shoes held in their retracted position by a garter spring move against a surface of an element to be driven under the influence of centrifugal force when a predetermined rotational speed has been exceeded. The two shoes each present a single clutching surface so that inaccuracies in the formation of either of these surfaces may result in poor clutching contact over substantially the entire intended zone of shoe operability.

It would, therefore be desirable to provide a centrifugal clutch wherein the intended zone of shoe operability is substantially commensurate with the actual zone of operability despite problems with maintaining manufacturing tolerances.

Another type of centrifugal clutch found in the prior art is that disclosed in U.S. Pat. No. 2,722,304 wherein a clutch element is formed with a series of radial slots having ribs therebetween. Individual shoes are disposed in the slots and all shoes are retained in a retracted position by a single garter spring.

Although such utilization of a plurality of shoe segments may reduce the likelihood of major zones of poor clutching contact by reason of inaccuracies in a single segment, it will be appreciated that the ribs on opposite sides of each clutch element confine the clutch elements to a particular pattern of clutching contact. Thus, where inaccuracies in the profiles of the individual elements are present, the elements are not permitted to "play" into an engaging pattern more suitable for complete driving contact.

It would, therefore, be desireable to provide a centrifugal clutch with a plurality of shoe segments in order to approach conformance of the intended zone of shoe operability with the actual zone and to additionally provide for controlled shoe "-play" into an engaging pattern suitable for preferred driving contact.

A further disadvantage of the prior device proposing individual shoe segments may be attributed to the absence of any substantial normal component of force induced on the segments by the driving ribs. Without such a force component, clutching engagement is dependent solely on centrifugal force.

It would therefore be additionally desirable to provide for the driving of individual shoe segments so as to induce such a force component in each segment, particularly in a manner that enhances the orientation of the segments in a preferred pattern of driving contact.

OBJECTS AND SUMMARY OF THE INVENTION

It is therefore a general object of the present invention to provide an improved clutch structure which effectively obviates or minimizes many of the drawbacks of previously developed clutches such as those noted above.

It is a particular object of the present invention to provide a unique centrifugal clutch structure wherein complete clutching surface contact between a driven and driving member is enhanced by providing for conformance of the intended zone of shoe operability with the actual zone, despite problems with manufacturing tolerances.

It is a related object of the present invention to provide such a clutch structure through the utilization of a plurality of shoe assemblies comprised of individual shoe segments with controlled shoe segment movement further facilitating preferred driving contact.

It is a further object of the present invention to provide for the driving of each of such shoe segments so as to induce a normal force component that enhances clutching engagement.

At least some of the foregoing objects are accomplished by the provision of a preferred embodiment of a centrifugal clutch according to the present invention wherein a driving hub is provided having a central body portion from which a plurality of equally spaced, generally radially extending driving fingers project. These radially extending fingers, together with the hub, define an equal plurality of pockets in each of which a clutch shoe assembly is disposed. Each clutch shoe assembly is comprised of a plurality of generally radially extending clutch shoe segments. Each driving finger and each shoe segment is provided with an arcuate, longitudinally facing recess or channel. These channels receive a spring which exerts a biasing force tending to retain the shoe segments in a retracted position. In this position the channels are disposed to define a continuous circular recess.

The driving fingers and shoe segments have conforming forward convex and rearward concave surfaces extending in a generally radial direction so that in assembly the convex and concave surfaces in adjacency are brought into generally abutting relationship. As a result, each shoe segment acts as an extension of the driving finger giving rise to a more effective force transmission. Also, because the shoe segments can slide relative to each other, each clutch shoe engages the clutching surface of the driven member over its entire clutching surface.

DESCRIPTION OF THE DRAWINGS

While the invention is particularly pointed out and distinctly claimed in the concluding portion of the specification, a preferred embodiment is discussed in the following detailed description which may be best understood when read in connection with the accompanying drawings in which:

DETAILED DESCRIPTION OF A PREFERRED EMBODIMENT

Detailed Structure

Figure 1:
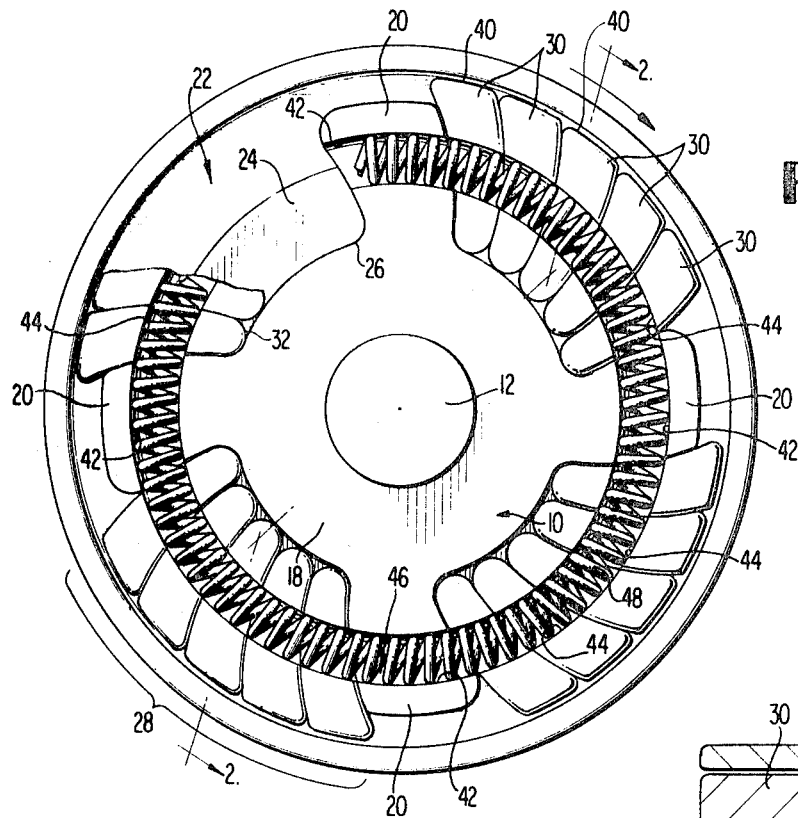
FIG. 1 is a plan, partially fragmented view of a segmented centrifugal clutch according to the present invention.

With reference now to FIG. 1, a plan, partially fragmented view of a segmented centrifugal clutch according to the present invention may be seen. The clutch includes a driving hub 10 disposed on and driven by a rotary drive means in the form of driving shaft 12.

Figure 2:
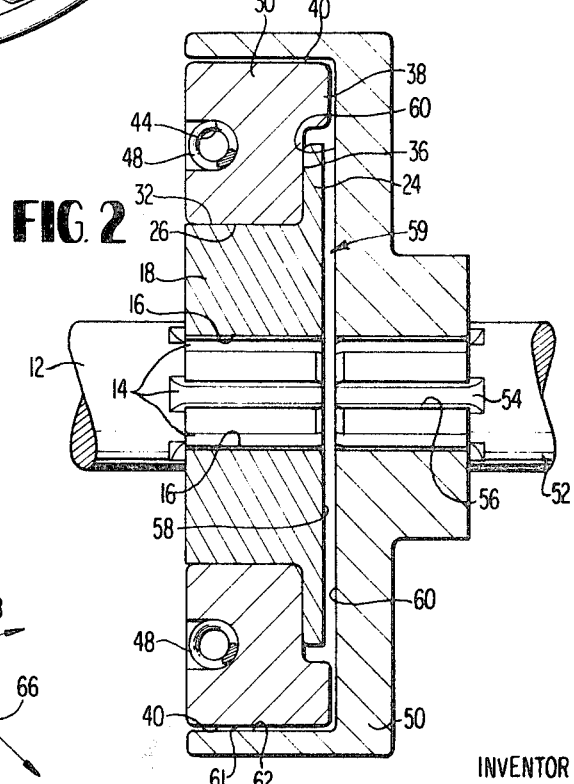
FIG. 2 is a cross-sectional view of the segmented centrifugal clutch of FIG. 1 taken along line 2—2 thereof.

By reference to FIG. 2 it may be seen that the driving rotational connection between the shaft 12 and the clutch hub 10 may be made through longitudinally extending spline ribs 14 formed on the driving shaft 12. These ribs may fit within appropriate slots 16 formed axially of the generally cylindrically shaped clutching assembly. It will, however, be appreciated that any suitable driving connection may be employed.

The driving hub 10 is formed with a generally cylindrical body portion 18 from which a plurality of circumferentially spaced, generally radially extending driving fingers 20 project. Preferably, these fingers are uniformly spaced. Disposed between the radially extending fingers 20 are an equal plurality of clutch shoe assembly receiving pockets 22. These pockets are defined by two adjacent ones of the driving fingers 20, and an annular flange 24 extending radially from the hub body portion 18. This flange 24 may be contiguous with the driving fingers 20 and an axially extending peripheral hub surface 26.

A clutch shoe assembly 28 is disposed within each clutch shoe receiving pocket 22. Each clutch shoe assembly 28 is comprised of a plurality of generally radially extending clutch shoe segments 30. Although four clutch shoe assemblies 28 each including five clutch shoe segments 30 are illustrated, it will be appreciated that virtually any reasonable numerical combination clutch shoe assemblies and clutch shoe segments may be employed.

Each clutch shoe segment 30 is biased to a rest position with the radially innermost surface 32 of the segment engaging the generally cylindrical, axially extending, peripheral hub surface 26. The clutch shoe segments are axially supported on the hub flange 24 as indicated at 36 in FIG. 2. Each clutch shoe segment 30 may be formed with a radially outer projection 38 extending longitudinally over the flange 24 so as to lend balance to the segment and to provide a greater longitudinal thickness of the segment at the radially outward portion thereof, thereby to produce a more extensive clutching surface 40.

Each driving finger 20 is provided with an arcuate recess or channel 42 while each clutch shoe segment 30 is also provided with an arcuate recess or channel 44 of similar curvature. The curvature of the recesses is such that with the clutch assembled and the shoe segments 30 in their retracted positions (FIG. 1) the aligned recesses define a continuous circular recess as indicated at 46.

Within this continuous recess or channel 46 a coiled garter spring 48 is disposed. The coiled garter spring serves to retain the clutch shoe segments and bias them inwardly to their retracted positions. It can be seen from FIG. 2 that the overall circular recess 46 is open toward the face of the driving assembly for the easy insertion of spring 48 into the recess. A retaining plate (not shown) may be mounted over the face portion of the driving assembly to facilitate the retention of the spring 48.

The driven assembly comprises a generally cylindrical drum member 50 which may be fixed to a rotary load, represented by a driven shaft 52 for rotation therewith in any suitable manner. For example, spline ribs 54 formed on the shaft 52 and fitting within axially extending slots 56 formed centrally of the drum 50 may provide a suitable connection. A clearance 59 is provided between the adjacent and facing, radially extending surfaces 58 and 60 of the driving hub 10 and the driven drum 50. Clearance, as indicated at 61, is also provided between the clutching surface 40 of each clutch shoe segment 30 and the correspondingly shaped clutching surface 62 of the drum 50 when the driven and driving assemblies are in a nonclutching condition.

Mode of Operation

As long as the driving shaft 12 rotates at a speed below a predetermined clutching speed, the clutch shoe assemblies 28 of the driving assembly will be held in their stabilized, retracted position within the retaining pockets 22 by the coiled garter spring 48. In this position the assemblies are confined by the driving fingers 20, i.e., the overall lateral extent of the assemblies 28 is generally equal to the lateral extent of the assembly receiving pockets 22.

Figure 3:
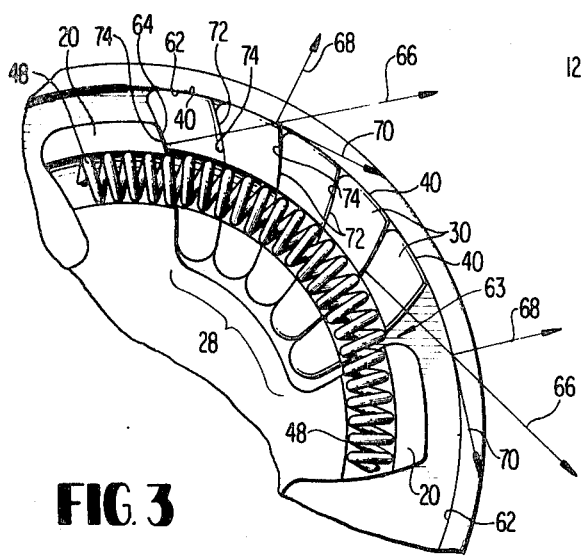
FIG. 3 is a partial fragmentary view of the segmented centrifugal clutch shown in FIGS. 1 and 2 wherein a driving assembly is in torque transmitting relationship with a driven assembly.

FIG. 3 is a partial fragmentary view of the centrifugal clutch of FIG. 1 wherein the clutching speed has been reached and the clutch shoe segments 30 have been urged radially outwardly into engagement with the internal clutching surface 62 of the driven drum 50 by centrifugal force acting against the spring bias of the spring 48. In this position a clearance 63 exists between the last segment 30 of each shoe assembly and the finger 20 driving the next assembly.

As will be apparent from the drawing and the foregoing description of the shoe assemblies 28, the individual shoe segments 30 are each able to move a limited amount laterally and generally radially of one another. Thus, a degree of controlled "play" of the shoe segments in each assembly is provided. Since the shoe assemblies are segmented, the actual zone of clutching operability of the assembly as a whole is permitted to approach the intended zone of operability despite individual errors in manufacturing tolerances that might detract from the ideal and illustrated conformity in radius of curvature of the segment clutching surfaces 40 and the drum clutching surface 62. Moreover, the permissible and controlled relative movement or "play" between the shoe segments 30 of each shoe assembly 28 allows the segments to alter their positions relative to one another so that each individual clutching surface 40 may engage that of the drum in a preferred pattern of driving contact, i.e., one which accounts for existing inaccuracies in the clutching surface 62 of the drum or the individual segment clutching surfaces 40.

In the preferred and illustrated embodiment, the relative movement of the individual segments 30 of the articulated shoe assembly 28 is controlled by the spring 48 and the lateral uniform profiles of the segments and the driving fingers 20 hereinafter more fully described. These particular profiles also function to enhance driving contact in a positive manner, also as set forth hereinafter.

A convex camming surface 64 provided by one lateral surface of each driving finger 20 transmits a resultant force 66 to the driven drum 50 through the clutch shoe segments 30 of each clutch shoe assembly 28. The resultant force 66 comprises a radially directed force component 68 and a tangentially directed component 70. It will be appreciated that the radially directed force component 68 is additive to the centrifugal force applied to the clutch shoe segment 30. Both of these forces are reacted by a normal force between the driven and driving members. Since the frictional force between these members is a function of that normal force, it will be apparent that increasing the radially outwardly directed force on the shoe assemblies 28 beyond the amount of the centrifugal force thereby increases the frictional efficiency of the engagement between the driven and driving members by increasing the normal force therebetween.

It will be noted that each segment 30 of each clutch shoe assembly 28 is independently urged outwardly by centrifugal force during rotation of the driving assembly. Additionally, it can be seen that generally radially extending convex lateral camming surfaces 72 of each segment cooperate with the adjacent, and generally complementary concave surfaces 74 of the next adjacent segment in the direction of rotation to apply the same type resultant force 66 with its radial component thereto. Each driving finger camming surface 64 also cooperates with a complementary concave surface 74 of the adjacent shoe segment 30. Therefore, each individual segment 30 as well as the shoe assembly 28 as a whole is forced radially outwardly against the clutching surface 62 of the driven drum 50 by both the centrifugal force of driving rotation and a radial component 68 of a resultant force 66 transmitted from the driving finger 20 through its adjacent segment 30 and from that segment to its adjacent segment, etc. By reason of the independent and individual nature of each segment 30 comprising the overall clutch shoe assembly 28, the entire overall clutching surface of each clutch shoe assembly 28 positively engages the clutching surface 62 of the driven drum 50 insofar as each segment clutching surface 40 is acted on by a radial force component which is additive to the centrifugal force.

SUMMARY OF ADVANTAGES

It can thus be seen that a segmented centrifugal clutch has been herein provided in a uniquely simple configuration so as to provide economy of manufacture and installation as well as improved clutching contact.

Of particular significance is the fact that the actual zone of clutching operability is permitted to approach the intended zone of operability through the articulated nature of discrete shoe assemblies.

In this respect the provision for controlled relative movement of the shoe segments is of unique importance since a preferred pattern of clutching engagement may be obtained despite nonconformities in the ideal sense between clutching surfaces that may result from manufacturing tolerances or wear.

Also of importance is the generally uniform and positive engagement of individual shoe segments by reason of the radial component of driving force exerted on each shoe. Of related advantageous significance is the fact that this engagement is provided while also controlling relative segment movement for preferred engaging patterns.

Of further significance is the fact that the clutch shoe assemblies are fully supported in the retracted position by the driving fingers and the hub body portion and are generally self-locking, and thus supported, in the extended position by reason of camming action and the articulated nature of the assemblies.

While what has been described herein is a preferred embodiment of the invention, it is of course understood that various modifications and changes may be made therein without departing from the invention. It is therefore intended to include in the following claims all such modifications and changes as may fall within the true spirit and scope of the present invention.

What I claim is:

1. A centrifugal clutch comprising:
   a rotatable driven assembly presenting a radially facing arcuate clutching surface; and
   a driving assembly mounted for rotation coaxially with said driven assembly and including:
      a driving hub;
      a plurality of circumferentially spaced, articulated clutch shoe assemblies each mounted on said driving hub for generally radial movement between a radially retracted position and a radially extended position for clutching engagement with said arcuate clutching surface of said driven assembly; and
      biasing means for biasing said shoe assemblies to a radially retracted position;
   said show assemblies each including a plurality of generally radially extending circumferentially adjacent and contiguous clutch shoe segments mounted for limited lateral and generally radial relative movement with respect to one another and each presenting an arcuate clutching surface having a radius of curvature substantially equal to the radius of curvature of said arcuate clutching surface of said driven assembly; and
   each of said clutch shoe assemblies being operable in response to a predetermined magnitude of centrifugal force created by rotation of said driving assembly to move generally radially outwardly into said extended position with said clutching surfaces of said clutch shoe segments engaging said clutching surface of said driven assembly.

2. A centrifugal clutch according to claim 1 wherein:
   said driving hub includes:
      a central body portion; and
      a plurality of circumferentially spaced, generally radially extending driving fingers;
   said plurality of circumferentially spaced articulated clutch shoe assemblies being mounted between circumferentially adjacent ones of said driving fingers.

3. A centrifugal clutch according to claim 2 wherein:
   each of said driving fingers and each of said shoe segments includes camming surface means for imparting a force resultant, having radial and tangential components, through an adjacent one of said shoe segments to said driven assembly.

4. A centrifugal clutch according to claim 3 wherein:
   each of said camming surface means comprises a convex, arcuate, lateral face and wherein
   each of said shoe segments includes a concave, arcuate, lateral face complementary to an adjacent one of said convex faces.

5. A centrifugal clutch according to claim 1 wherein:
   each of said shoe segments in each of said shoe assemblies includes:
      a convex, arcuate, lateral face, and
      a concave, arcuate lateral face,
   adjacent ones of said convex and concave faces of adjacent ones of said segments being in complementary engagement and being operable to control relative movement of said shoe segments with respect to one another and to permit said clutching surfaces of said segments to become oriented in a preferred engaging pattern with said clutching surface of said driven assembly.

6. In a centrifugal clutch including:
   a driving assembly adapted to be connected to rotary drive means;
   a driven assembly adapted to be connected to rotary load means, said driven assembly including arcuately extending first clutch face means facing inwardly toward the axis of rotation of said driven assembly;
   said driven assembly and said driving assembly having coaxially aligned axis of rotation;
   said driving assembly including
      a plurality of circumferentially spaced, centrifugally response clutch shoe means defining an extending second clutch face means facing said first clutch face means, said second clutch face means having a radius of curvature substantially the same as the radius of curvature of said first clutch face means, and
      support means mounting each of said clutch shoe means for movement between a radially retracted and a radially extended position;
   said support means including
      generally radially extending driving finger means circumferentially spaced about said each of said clutch shoe means, and
      spring biasing means for biasing said clutch shoe means to said retracted position;
   said clutch shoe means being radially operable to move outwardly for engagement of said second clutch face means with said first clutch face means in response to a predetermined magnitude of centrifugal force created by the rotation of said rotary drive means;
   said driving fingers being operable to transmit a force resultant, having components in the radial and tangential directions with respect to the driven assembly, to said driven assembly through said clutch shoe means;
   the centrifugal force action on said clutch shoe assembly means and said radially outwardly directed component of said force resultant being additive to increase frictional engagement between said clutch show assembly means and said driven means, the improvement comprising;
   each said clutch shoe means comprising a plurality of generally radially extending, independently acting clutch shoe segments; and
   each adjacent clutch shoe segment being operable to transmit said resultant force to said driven means through a next adjacent one of said clutch shoe segments in the direction of intended rotation.

7. The improvement according to claim 6 wherein said finger means and said clutch shoe means are formed with a generally annular recess formed in a radial face thereof for the axial reception of said spring biasing means.

8. The improvement according to claim 6 wherein each of said clutch shoe means is supported in the retracted position by said driving fingers and a central hub portion of said driving assembly.

9. A centrifugal clutch comprising:
   a driven drum;
   a driving hub including;
      a central body portion,
      a plurality of circumferentially spaced, driving fingers extending generally radially from said hub portion, and
      radially extending flange means projecting from said body portion and contiguous with said driving fingers,
   said hub portion, said driving fingers and said flange means defining a plurality of clutch shoe receiving pockets;
   a plurality of articulated clutch shoes, said plurality of clutch shoes being received and supported in said plurality of receiving pockets and disposed to receive a driving force from said plurality of driving fingers.

said plurality of articulated clutch shoes each comprising a plurality of clutch shoe segments;

a continuous recess defined by a plurality of recesses formed in each of said plurality of driving fingers and said clutch shoe segments when in assembly; and a spring disposed within said continuous recess and serving to bias said plurality of clutch shoe segments to a retracted position, said plurality of clutch shoe segments engaging said driving drum to impart driving motion thereto when a predetermined speed of rotation thereof is exceeded.

10. An apparatus according to claim 9 wherein:

each of said clutch shoe segments extends generally radially outwardly, and each of said clutch shoe segments and said driving fingers are arcuately curved in the same direction.

11. In a centrifugal clutch including a plurality of circumferentially spaced, centrifugally responsive clutch shoe means, the improvement comprising:

each of said clutch shoe means being comprised of an articulated clutch shoe assembly having a plurality of circumferentially adjacent and contiguous clutch shoe segments mounted for limited lateral and generally radial movement with respect to one another.

12. The improvement according to claim 11 including:

a driving finger cooperating with each of said articulated clutch shoe assemblies to impart a force resultant having radial and tangential components, thereto.

13. The improvement according to claim 12 wherein:

each of said clutch shoe segments of each of said clutch shoe assemblies is provided with a camming surface for imparting a force resultant, having radial and tangential components to and adjacent one of said segments.

14. The improvement according to claim 11 wherein:

each of said clutch shoe segments includes lateral, arcuate faces cooperating with lateral arcuate faces of an adjacent segment of a given one of said shoe assemblies to control relative movement of said shoe segments with respect to one another.

* * * * *

PO-1050
(5/69)

UNITED STATES PATENT OFFICE
CERTIFICATE OF CORRECTION

Patent No. 3,640,365                              Dated February 8, 1972

Inventor(s) Charles Frederick Henry

It is certified that error appears in the above-identified patent and that said Letters Patent are hereby corrected as shown below:

Column 1, line 6, after "with" change "articulates" to -- articulated -- .
Column 1, line 41, after "be" change "desireable" to -- desirable -- .
Column 3, line 4, after "combination" add -- of -- .

Claim 6, line 9, after "aligned" change "axis" to -- axes -- .
Claim 6, line 12, change "response to -- responsive -- .

Signed and sealed this 27th day of June 1972.

(SEAL)
Attest:

EDWARD M. FLETCHER, JR.                ROBERT GOTTSCHALK
Attesting Officer                      Commissioner of Patents